United States Patent
Goedeke et al.

(10) Patent No.: US 7,910,506 B2
(45) Date of Patent: Mar. 22, 2011

(54) LEAD-FREE GLASS COMPOSITES WITH A LOW THERMAL EXPANSION COEFFICIENT

(75) Inventors: Dieter Goedeke, Landshut (DE); Susanne Schmid, Rottenburg (DE)

(73) Assignee: Schott AG, Mainz (DE)

( * ) Notice: Subject to any disclaimer, the term of this patent is extended or adjusted under 35 U.S.C. 154(b) by 288 days.

(21) Appl. No.: 12/166,411

(22) Filed: Jul. 2, 2008

(65) Prior Publication Data

US 2009/0011917 A1 Jan. 8, 2009

(30) Foreign Application Priority Data

Jul. 5, 2007 (DE) .......................... 10 2007 031 317

(51) Int. Cl.
*C03C 8/24* (2006.01)
*C03C 8/02* (2006.01)
*C03C 3/091* (2006.01)

(52) U.S. Cl. ................. 501/15; 501/17; 501/21; 501/32; 501/66

(58) Field of Classification Search .................... 501/15, 501/17, 32, 66, 21
See application file for complete search history.

(56) References Cited

U.S. PATENT DOCUMENTS 4,287,260 A * 9/1981 Prall .............................. 428/410
5,206,190 A * 4/1993 Jean et al. ........................ 501/32

FOREIGN PATENT DOCUMENTS

| DE | 1 621 026 | | 2/1971 |
| DE | 31 23 600 | | 3/1982 |
| EP | 0478971 | * | 4/1992 |
| GB | 2 080 790 | | 2/1982 |

* cited by examiner

*Primary Examiner* — Karl E Group
(74) *Attorney, Agent, or Firm* — Michael J. Striker

(57) ABSTRACT

The glass composite has a linear thermal expansion coefficient $\alpha_{(20\text{-}300)}$ of $1.8 \times 10^{-6} K^{-1}$ to $2.4 \times 10^{-6} K^{-1}$, a glass transformation temperature Tg of less than 650° C., and a composition, in weight percent based on oxide content, of: 5-9, $B_2O_3$; 1-3, $Na_2O$; 15-22, $Al_2O_3$; 61-68, $SiO_2$; 0.2-0.5, $K_2O$; and 5.5-8.5, MgO. It can be made by sintering a mixture of 40 to 60 wt. % of a borosilicate glass powder and 60 to 40 wt. % of a cordierite powder. The powder mixture can be used to make a glass solder for joining parts, to make a sintered body with thermal shock resistance, or for glazing or soldering PZT ceramics.

9 Claims, No Drawings

LEAD-FREE GLASS COMPOSITES WITH A LOW THERMAL EXPANSION COEFFICIENT

BACKGROUND OF THE INVENTION

The subject matter of the invention is a lead-free glass composition with a low thermal expansion coefficient.

Glass composites are known in themselves. They are primarily embodied as glass solder for joining applications. They are made from a glass powder, to which inert filling materials are added to influence the thermal expansion coefficient. The thermal, expansion coefficient of the solder may be changed or adjusted by these filling materials to that of the metal, glass or ceramic parts connected with the glass solder. The solder (i.e. the glass phase) frequently crystallizes at higher filling material content. The glass content of the solder remains glassy in the not crystallized, so-called stable glass solder. Generally the amount of added filling material is limited by the unavoidable impairment of ability of the solder to flow due to additional of the filling material.

SUMMARY OF THE INVENTION

It is an object of the present invention to provide a lead-free glass composite with a low thermal expansion coefficient, which is suitable, for example, for use as a high temperature joining material and for making a sintered body, as a substrate material for integrated microwave circuits, and for exhaust gas catalytic reactor applications, and which has a thermal shock resistance or resistance to high temperature change.

According to the invention the glass composite has a linear thermal expansion coefficient $\alpha_{(20\text{-}300)}$ of $1.8\times10^{-6}K^{-1}$ to $2.4\times10^{-6}K^{-1}$, a glass transformation temperature Tg of less than 650° C., and contains, in weight percent based on oxide content, of: 5-9, $B_2O_3$; 1-3, $Na_2O$; 15-22, $Al_2O_3$; 61-68, $SiO_2$; 0.2-0.5, $K_2O$; and 5.5-8.5, MgO.

In preferred embodiments that can be used to obtain especially good results the glass composite contains, in weight percent based on oxide content, of: 5.4-8.1, $B_2O_3$; 1.6-2.7, $Na_2O$; 15.3-21.8, $Al_2O_3$; 62.3-65.9, $SiO_2$; 0.2-0.4, $K_2O$; and 5.5-8.3, MgO.

This glass composite can be made by sintering a mixture consisting of 60 to 40 weight percent of a borosilicate glass powder $\alpha_{(20\text{-}300)}=3.1\text{-}3.4\times10^{-6}K^{-1}$) and 40 to 60 weight percent of a cordierite powder. It is surprising that a filling material content of 40 percent by weight or more is tolerated in the glass composite without devitrification occurring. The filling material concentration in conventional stable glass solder can only increase over 20 wt. % in a few cases, since the flow and sintering properties of the composite deteriorate and then the glass phase crystallizes. Cordierite has a composition of $2\times MgO\times2\ Al_2O_3\times5\ SiO_2$. However in the case of the present invention variations from this stoichiometry can be tolerated. Suitable cordierite compositions can contain, in weight percent based on oxide content, 3.8-13.8, MgO; 30-34.8, $Al_2O_3$, and 44 to 51.4, $SiO_2$. Depending on its purity cordierite can also contain FeO, SrO, and $K_2O$.

The glass composite ingredients comprise a borositicate glass powder with a thermal expansion coefficient $\alpha_{(20\text{-}300)}$ =$3.1\text{-}3.4\times10^{-6}K^{-1}$, especially from $3.2\text{-}3.3\times10^{-6}K^{-1}$. This glass has been known for decades and contains, in percent by weight based on oxide content: 78.5-85, $SiO_2$; 13-14, $B_2O_3$; 2-3, $Al_2O_3$; 3-4.5, alkali oxides; and optionally up to 0.7, alkaline earth oxides. The glass can also contain traces of refining agents, e.g. $Al_2O_3$, $Sb_2O_3$, $SnO_2$, $CeO_2$, Cl, and F. The borosilicate glass and cordierite are ground to an average grain size of from 3 μm to 10 μm, especially 3 to 6 μm, and are uniformly mixed. The mixing is especially easy, when the cordierite and borosilicate glass are ground together in a mixture to the desired grain size.

Glassy cordierite can also be used instead of crystalline cordierite. The term "glassy cordierite" means a glass mass, which has the composition of cordierite, but is not crystalline. This "glassy" cordierite can likewise be used, because it is converted into the crystalline cordierite during the sintering process.

The composite glass mixture of borosilicate glass and cordierite can be processed to form a sitered body. For this purpose the mixture can be mixed with a binding agent, e.g. an acrylate binder, a nitrocellulose binder, or a polyethylene glycol (PEG) binder, pressed to form the desired body, and sintered in an oven at a temperature between 1000° C. and 1100° C. to form the solid body, which has a slight residual porosity of less than 6%. Processing to form a plate-shaped sintered body that acts as a carrier substrate for applications requiring thermal shock resistance is a preferred use of the composite.

If the composite is used as a solder, a paste with a suitable fluidity is formed from the powder mixture and applied to at least one of the parts to be joined at the place where it is joined to another part. When the application occurs with a brush or a spray pistol, a liquid suspension, e.g. water or ethanol suspension, can be used. When the application occurs by screen printing, the composite is mixed with a suitable screen printing oil, e.g. a modified turpentine or a glycol, to form a screen printing paste and applied to the joining site. After drying the paste, which can also occur during the heating of the parts to be joined to the soldering temperature, the connection of the parts occurs by melting and/or sintering at temperatures up to 1300° C. These joints or connections are stable up to temperatures of 1000° C. and are also high temperature resistant. Alternatively a low melting intermediate glass, e.g. a borosilicate glass, can be processed or worked. The glass composite according to the invention is especially suitable for connecting piezoelectric ceramic parts based on a modified lead zirconate itanate (PZT), which has a thermal expansion coefficient of about $2\times10^{-6}K^{-1}$. The glass composite powder can be processed to form foils. Suitable blanks, e.g. bands, rings, plates, and the like, can be cut out or punched out from the foils, which can be used as solder bodies, especially with complicated solder joints.

The lead-free glass composite of the invention is available for use both as a glass solder for high temperature joining applications and for making a sintered body with a thermal shock resistance or resistance to high temperature change. It is, above all, suitable for soldering or glazing of ceramics, e.g. PZT ceramics, because it has a low thermal expansion coefficient of $1.8\times10^{-6}K^{-1}$ to $2.4\times10^{-6}K^{-1}$. The comparatively low sintering starting temperature of about 630° C. to 680° C. makes it especially suitable for solder. It is emphasized here that the glass composite is a so-called stable glass solder, i.e. that the glass phase does not crystallize during the sintering and/or melting process, so that a solder connection can be heated again and separated without great effort in contrast to crystallizing solders.

EXAMPLES

The following examples were prepared by mixing different amounts of a borosilicate glass powder containing (in wt. % based on oxide content) 13.5 wt. % $B_2O_3$, 4.2 wt. % $Na_2O$, 2.2 wt. % $Al_2O_3$ and 78.6 wt. % $SiO_2$ with cordierite powder with a composition (in wt. % based on oxide content) of 13.8 wt. %

MgO, 34.8 wt. % $Al_2O_3$, and 51.4 wt. % $SiO_2$. The powder has a grain size of $d_{50}$ of 5±1 μm.

The mixture was heated and the starting temperature for the sintering was determined by a heated microscope with automatic image processing. The sample was sintered at about 1100° C. within 3 hours to a practically porefree sintered body. The thermal expansion coefficient, $\alpha_{(20-300)}$, and the glass transition temperature Tg were measured. The exemplary glass composites and their properties are reported in the following table I.

TABLE I

GLASS COMPOSITES OF THE INVENTION AND THEIR PROPERTIES

| | Example | | | |
|---|---|---|---|---|
| | 1 | 2 | 3 | 4 |
| $B_2O_3$ | 6.75 | 7.7 | 5.4 | 7.02 |
| $Na_2O$ | 2.1 | 2.4 | 1.7 | 2.2 |
| $Al_2O_3$ | 18.53 | 16.24 | 21.8 | 17.88 |
| $SiO_2$ | 65.03 | 68.94 | 62.3 | 65.58 |
| $K_2O$ | 0.35 | 0.4 | 0.28 | 0.36 |
| MgO | 6.89 | 5.93 | 8.27 | 6.61 |
| Sintering Starting Temperature | 645° C. | 652° C. | 663° C. | 673° C. |
| $\alpha$ (20-300)$10^{-6}$/K | 2.1 | 2.35 | 1.85 | 2.1 |
| Tg | 594° C. | n.d.* | 568° C. | 621° C. |

*n.d. = not determined

While the invention has been illustrated and described as embodied in a lead-free glass composition with a low thermal expansion coefficient, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A glass composite with a linear thermal expansion coefficient $\alpha_{(20-300)}$ of $1.8\times10^{-6}K^{-1}$ to $2.4\times10^{-6}K^{-1}$, a glass transformation temperature Tg of less than 650° C., and a composition, in weight percent based on oxide content, of: 5-9, $B_2O_3$; 1-3, $Na_2O$; 15-22, $Al_2O_3$; 61-65.9, $SiO_2$; 0.2-0.5, $K_2O$; and 5.5-8.5, MgO.

2. A glass composite with a linear thermal expansion coefficient $\alpha_{(20-300)}$ of $1.8\times10^{-6}K^{-1}$ to $2.4\times10^{-6}K^{-1}$, a glass transformation temperature Tg of less than 650° C., and a composition, in weight percent based on oxide content, of; 5.4-8.1, $B_2O_3$; 1.6-2.7, $Na_2O$; 15.3-21.8, $Al_2O_3$; 62.3-65.9, $SiO_2$; 0.2-0.4, $K_2O$; and 5.5-8.3, MgO.

3. The glass composite as defined in claim 1, which is made by sintering a mixture of 40 to 60 wt. % of a borosilicate glass powder and 60 to 40 wt. % of a cordierite powder;
   wherein said borosilicate glass powder has a composition, in weight percent based on oxide content, of 78.5-81, $SiO_2$; 13-14, $B_2O_3$; 2-3, $Al_2O_3$; and 3-4.5, alkali metal oxide; and
   wherein said cordierite powder has a composition, in weight percent based on oxide content, of 4-14, MgO; 30-35, $Al_2O_3$; and 44-51.5, $SiO_2$.

4. The glass composite as defined in claim 3, wherein the borosilicate glass powder and the cordierite glass powder each have an average grain size of from 3 μm to 10 μm.

5. The glass composite as defined in claim 4, wherein said average grain size is from 3 μm to 6 μm.

6. A method of making a high temperature joining compound, said method comprising forming a glass composite with a linear thermal expansion coefficient $\alpha_{(20-300)}$ of $1.8\times10^{-6}K^{-1}$ to $2.4\times10^{-6}K^{-1}$, a glass transformation temperature Tg of less than 650° C., and a composition, in weight percent based on oxide content, of: 5-9, $B_2O_3$; 1-3, $Na_2O$; 15-22, $Al_2O_3$; 61-65.9, $SiO_2$; 0.2-0.5, $K_2O$; and 5.5-8.5, MgO.

7. A method of making a sintered body, said method comprising sintering a powder mixture to form a glass composite, wherein said glass composite has a linear thermal expansion coefficient $\alpha_{(20-300)}$ of $1.8\times10^{-6}K^{-1}$ to $2.4\times10^{-6}K^{-1}$, a glass transformation temperature Tg of less than 650° C., and a composition, in weight percent based on oxide content, of: 5-9, $B_2O_3$; 1-3, $Na_2O$; 15-22, $Al_2O_3$; 61-65.9, $SiO_2$; 0.2-0.5, $K_2O$; and 5.5-8.5, MgO.

8. The method as defined in claim 7, wherein said powder mixture consists of 40 to 60 wt. % of a borosilicate glass powder and 60 to 40 wt. % of a cordierite powder, said borosilicate glass powder has a composition, in weight percent based on oxide content, of 78.5-81, $SiO_2$; 13-14, $B_2O_3$; 2-3, $Al_2O_3$; and 3-4.5, alkali metal oxide, and said cordierite powder has a composition, in weight percent based on oxide content, of 4-14, MgO; 30-35, $Al_2O_3$; and 44-51.5, $SiO_2$.

9. A method of glazing piezoelectric ceramic parts, said method comprising forming a glass composite with a linear thermal expansion coefficient $\alpha_{(20-300)}$ of $1.8\times10^{-6}K^{-1}$ to $2.4\times10^{-6}K^{-1}$, a glass transformation temperature Tg of less than 650° C., and a composition, in weight percent based on oxide content, of: 5-9, $B_2O_3$; 1-3, $Na_2O$; 15-22, $Al_2O_3$; 61-65.9, $SiO_2$; 0.2-0.5, $K_2O$; and 5.5-8.5, MgO.

* * * * *